United States Patent Office 3,360,905
Patented Jan. 2, 1968

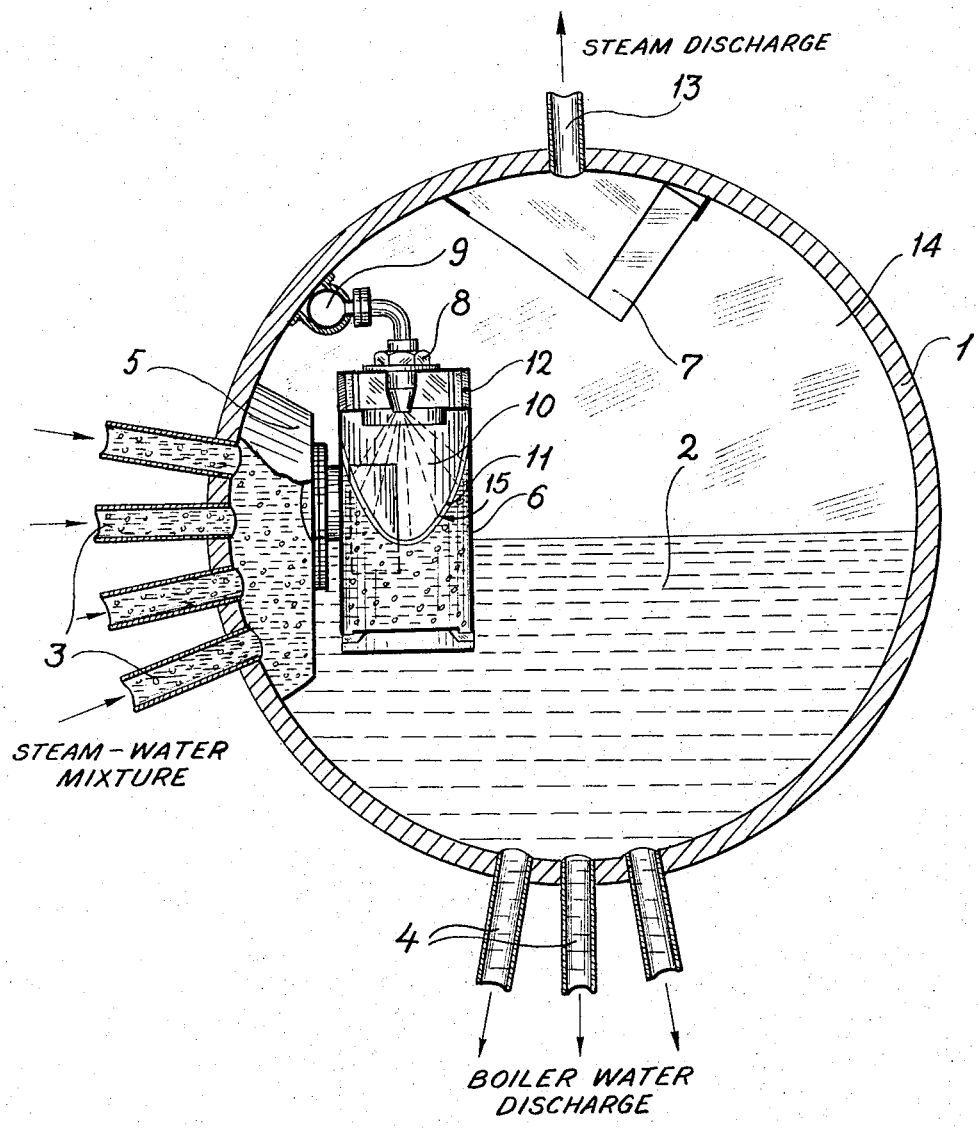

3,360,905
STEAM SEPARATOR OF VORTEX TYPE
Risto Heikki Aarnio, Tampere, Finland, assignor to Oy Tampella Ab, Tampere, Finland, a corporation
Filed Mar. 28, 1966, Ser. No. 537,758
2 Claims. (Cl. 55—238)

ABSTRACT OF THE DISCLOSURE

An improved steam separator of the centrifugal type, said separator being disposed within the steam drum of a boiler. The steam separator has a chamber into which a steam-water mixture is introduced tangentially to produce a paraboloidic interface between water in the lower part of the chamber and steam in the upper part of the chamber. A spray nozzle is provided in the upper part of the separator chamber to introduce clean feed water in the form of a shower of drops which impinge upon said paraboloidic interface. The drops form a film of clean feed water upon the boiler water in the lower part of the separator chamber, whereby steam bubbles forced to travel through the steam-boiler water mixture far forced to travel through said clean water film in their travel to the steam exhaust means of the separator chamber.

---

Steam separators of the vortex or centrifugal type have been used for over twenty years especially in the steam drums of water tube boilers to separate steam, created in the riser tubes, from the boiler water. Demands on the purity of the steam leaving the boiler have increased at the same time as the working pressures of the boilers have increased, making it more difficult to separate the steam from water and increasing the amount of salts dissolved in the steam. It has been noticed that with present steam separators of centrifugal type and dry filters disposed downstream of the separators it is not possible to fulfill present requirements for steam purity if the amount of impurities in the boiler water can not be kept under the given standard values. It can be presumed that this arises from the fact that when a steam bubble is separated from the water-steam-mixture in the steam separator of centrifugal type the water film covering the bubble will break off in the surface limit, partly forming very small water drops containing impurities present in the boiler water, the drops thus formed have a mass which is too small to permit them to be separated by the centrifugal force inside the separator or in a preceding filter made of metal sheets or metal nets but instead follow the steam stream leaving the boiler drum.

To improve the quality of steam there has been built for example in U.S.S.R., in the steam space of steam cylinders, equipped with steam separators of centrifugal type, a screen made of horizontal, perforated sheets, upon which filter there is kept a film of clean feed water. The steam flowing from the steam space of the drum is forced to go through this film on the filter to force the boiler water drops containing impurities inside the steam stream to be caught by said film of feed water.

A filter of this type greatly restricts the also otherwise restricted space available for inspections and repairs. The washing effect of this type of filter is not the best possible, because the steam forces itself through the film of feed water either in continuous streams at the perforations of the filter sheet or as big steam bubbles inside of which bubbles the suspended water drops do not come into contact with the feed water film.

The main characteristics of the improvement in accordance with this invention is to place inside the steam drum of a steam separator of the centrifugal type of a steam boiler means for introducing clean feed water in drop form in the steam space of such separator of centrifugal type. Said drops are led to the paraboloidic interface between the steam and boiler water in said steam separator said drops forming on said interface a film of feed water through which film steam bubbles are forced to travel.

The purpose of this invention is to increase the purity of the steam flowing from the steam separator of centrifugal type into the steam space of a steam cylinder; this is accomplished in such a way that a part of the feed water, which is many times cleaner than the boiler water, is injected in the steam space of the steam separator of centrifugal type, whereby the drops of feed water are continuously created on the interface between water and steam inside of the steam separator of centrifugal type, through which film the steam bubbles, at the same time as they are separated from boiler water, are forced to travel, whereby the smaller water drops created by the breaking of said steam bubbles have a purity which is equal to that of the feed water.

In the following description a device according to this invention is described as an example only and it will be understood that this is only for clarifying the invention and not in a limiting sence. The accompanying drawing shows a section of a device in accordance with this invention in which is a steam drum 1, with accompanying stand pipes 3 for conducting a steam-water mixture to a collector chamber 5. From chamber 5 such mixture is fed tangentially into the steam separators of centrifugal type, one such separator being shown at 6. From separators 6 the steam leaves into the steam space 14 of the cylinder 1 and is then led through a drying filter 7 into steam discharge pipes, of which one is shown at 13. Boiler water 2 leaves the separators underneath into the water space of the cylinder and is returned through downcomer or discharge pipes 4 into the heating surfaces.

In accordance with this invention in the upper part of the steam separator 6 there is placed a nozzle 8, in which feed water is fed from a distributing pipe 9 leading to different separators with a constant excess of pressure. The nozzle 8 spreads the feed water by creating in the separators steam space a cone 10 filled with water drops. The water drops travel against the flow stream occurring in said steam space and come into contact with the paraboloidic interface 15 between boiler water and steam created by the centrifugal effect of the rotating steam-water mixture and build there a clean water film 11 which because of the continuous flow of new feed water drops and the rotation of the boiler water keeps its thickness constant.

The steam cleaned in the feed water film and later by the drops from the nozzle leaves the separator through an opening on its top and then through a screen 12. The purpose of the screen 12 is to collect the small drops in the steam into bigger drops, which then are separated from the steam in the steam space of the drum by gravity.

What we claim is:
1. In a steam boiler having a steam drum comprising an upper steam space, a steam discharge pipe at the top communicating with the steam space and a lower liquid filled space defining a liquid level, a liquid discharge in the drum below the liquid level, an inlet pipe in the side wall of the drum, means defining a flow collector chamber within the drum connected to the drum inlet pipe, and a steam separator of the centrifugal type disposed within the steam drum, the improved steam separator having a substantially imperforate cylindrical wall, an open bottom and a steam outlet at the top thereof, said cylindrical wall defining a substantially unobstructed separator chamber, said cylindrical wall extending below said liquid level, conduit means for introducing a steam-boiler water mixture into the separator chamber tangentially thereof so as to create a vortex in the water in the lower part of the steam separator chamber, the portion of the steam separator chamber above the water therein containing steam, the said steam outlet on the separator chamber communicating with the upper steam space, said conduit means providing introduction of the steam-water mixture into said separator chamber thereby creating an upwardly concave paraboloidic interface between the boiler water and the steam in the steam separator chamber, and a distributing pipe within said drum connected at one end to a external supply source of clean feed water and terminating at the other end in a nozzle positioned coaxially within the cylindrical wall of the separator at the top thereof providing means for introducing clean feed water in the form of a shower of drops into the upper, steam-containing space in the steam separator chamber so that such drops impinge upon the surface of the boiler water at said paraboloidic steam-boiler water interface and forms a film of clean feed water upon said paraboloidic interface in the lower part of the separator chamber, whereby steam bubbles from the steam-boiler water mixture are forced to travel through said clean water film in their travel to the steam outlet of the separator chamber.

2. A steam separator of centrifugal type according to claim 1, wherein the nozzle is disposed spaced from the steam outlet on the separator chamber in such manner that steam bubbles escaping through the steam space of the steam separator passes through the shower of drops of clean feed water falling from the nozzle.

References Cited

UNITED STATES PATENTS

| | | | |
|---|---|---|---|
| Re. 16,315 | 4/1926 | Senseman | 55—236 |
| 2,264,248 | 11/1941 | Schrader | 55—459 |
| 2,293,740 | 8/1942 | Kooistra | 55—459 |
| 2,409,088 | 10/1946 | Weits et al. | 55—238 |
| 2,708,981 | 5/1955 | Armacost et al. | 55—95 |
| 2,895,566 | 7/1959 | Coulter | 55—55 |

HARRY B. THORNTON, *Primary Examiner.*

B. NOZICK, *Assistant Examiner.*